(12) United States Patent
Mollhagen

(10) Patent No.: US 7,891,946 B2
(45) Date of Patent: Feb. 22, 2011

(54) WIND POWER PLANT AND ROTOR BLADE ADJUSTING DRIVE THEREFOR

(75) Inventor: Klaus-Peter Mollhagen, Memmingen (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 866 days.

(21) Appl. No.: 11/891,265

(22) Filed: Aug. 9, 2007

(65) Prior Publication Data

US 2008/0056881 A1 Mar. 6, 2008

(30) Foreign Application Priority Data

Aug. 10, 2006 (DE) .................. 20 2006 012 314 U

(51) Int. Cl.
*F03D 11/02* (2006.01)
(52) U.S. Cl. .................. 416/155; 416/169 R
(58) Field of Classification Search .......... 416/155, 416/159, 160, 162, 169 R; 290/44, 55; 185/39, 185/40
See application file for complete search history.

(56) References Cited

U.S. PATENT DOCUMENTS

| 6,428,274 | B1 * | 8/2002 | Hehenberger | 416/153 |
| 7,261,517 | B2 * | 8/2007 | Uphues et al. | 416/153 |
| 7,355,294 | B2 * | 4/2008 | Teichmann | 290/44 |
| 7,513,742 | B2 * | 4/2009 | Rogall et al. | 416/47 |

* cited by examiner

*Primary Examiner*—Ninh H Nguyen
(74) *Attorney, Agent, or Firm*—Dilworth & Barrese, LLP

(57) ABSTRACT

The present invention relates to a rotor blade adjusting drive for adjusting the pitch angle of a rotor blade of a wind power plant, comprising a drive train which at the output end can be connected with the rotor blade and/or a bearing member supporting the rotor blade, and a spring accumulator connectable with the drive train, which includes a spring accumulator shaft, a spring accumulator housing and a spring means which can be tensioned by rotating spring accumulator shaft and spring accumulator housing relative to each other, wherein the spring accumulator shaft and/or the spring accumulator housing can be uncoupled from the drive train and is rotatable with respect to the same for biasing the spring accumulator, wherein a braking device is provided for retarding and/or holding the spring accumulator shaft and/or the spring accumulator housing against the spring bias in the uncoupled condition of the spring accumulator.

20 Claims, 3 Drawing Sheets

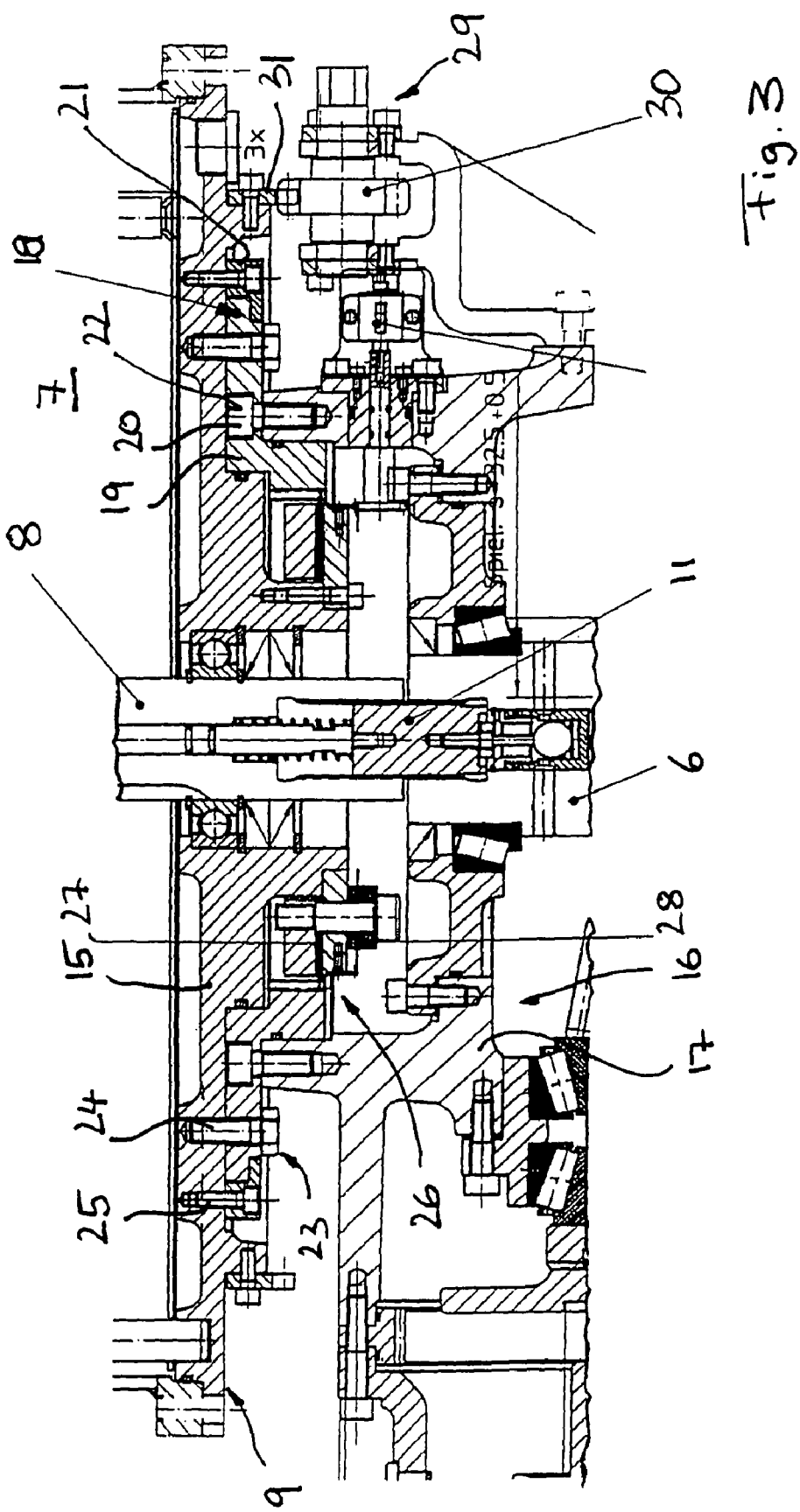

WIND POWER PLANT AND ROTOR BLADE ADJUSTING DRIVE THEREFOR

BACKGROUND OF THE INVENTION

The present invention relates to a wind power plant with a rotor which includes rotor blades adjustably mounted on a rotor hub. In particular, the invention relates to a rotor blade adjusting drive for adjusting the pitch angle of the rotor blades of such a wind power plant, comprising a drive train connectable at the output end with the rotor blade and/or a bearing member supporting the rotor blade, and a spring accumulator connectable with the drive train, which includes a spring accumulator shaft, a spring accumulator housing and a spring means which can be tensioned by rotating spring accumulator shaft and spring accumulator housing relative to each other, wherein the spring accumulator shaft and/or the spring accumulator housing can be uncoupled from the drive train and is rotatable with respect to the same for biasing the spring means.

For power control, wind power plants usually employ an adjustment of the rotor blades. The individual rotor blades can rotatably be connected with the rotor hub via large bearings, so that the rotor blades can be rotated about their longitudinal axis and hence their pitch angle can be adjusted. For adjusting the rotor blades, electric drive motors mostly are used, which adjust the rotatable ring of the rotor blade bearing and hence the rotor blades themselves via a transmission and an output pinion.

If an interruption or some other malfunction of the drive motors occurs in the power supply of the drive motors, the rotor blades must be brought into a safe position for safety reasons. In many cases, electric batteries are provided for this purpose, in order to achieve an emergency supply of the drive motors. On the other hand, mechanical spring accumulators have already been proposed for such cases, in order to effect the return of the rotor blades into a neutral position for safety reasons. To enable these mechanical spring accumulators to effect the adjustment of the rotor blades, the springs of the spring accumulators must be biased before operation. For this purpose, it has been proposed to uncouple the inside spring accumulator shaft from the drive train and rotate the same with a suitable tool, until the desired bias is achieved. Upon application of the bias, the spring accumulator shaft is connected with the drive train of the rotor blade adjusting drive by means of a clutch. During the entire winding operation, however, a considerable risk consists in that in the case of improper handling the springs of the spring accumulator strike back uncontrolled and hurt the operator with the winding tool.

SUMMARY OF THE INVENTION

Proceeding therefrom, it is the object underlying the invention to create an improved wind power plant as mentioned above and an improved rotor blade adjusting drive therefor, which avoid the disadvantages of the prior art and develop the same in an advantageous way. In particular, a spring accumulator should be created, which is easy to handle and can be biased without a risk of injury and excludes an uncontrolled striking back in the case of improper handling.

In accordance with the invention, this object is solved by a rotor blade adjusting drive and a wind power plant as described herein. Preferred aspects of the invention are also described herein.

Thus, it is proposed that the spring accumulator component released when biasing the spring accumulator should be secured against striking back as a result of the spring force produced, and when biasing, an inhibiting resistance should be produced against the spring force gradually acting on this released component. In accordance with the invention, a braking device is provided, which in the uncoupled condition retards and/or holds the spring accumulator shaft and/or the spring accumulator housing against the spring bias produced when the spring accumulator is biased. Thus, the braking device inhibits an uncontrolled return movement of the spring accumulator shaft and/or the spring accumulator housing, which would be obtained in the case of a spring accumulator housing released from the drive train or in the case of a released spring accumulator shaft, for instance when the winding tool slips off.

In accordance with a development of the invention, the spring accumulator preferably is designed such that the spring means is formed to be tensionable when the spring accumulator shaft is engaged. In particular, it can be provided in contrast to the prior art that for tensioning the spring means not the spring accumulator shaft, but the spring accumulator housing is uncoupled from the drive train and rotated. In accordance with a development of the invention, the spring accumulator housing is rotatably mounted on a drive train supporting member by a pivot bearing, wherein releasable arresting means preferably are provided for arresting the spring accumulator housing in at least one predetermined rotary position with respect to the drive train support. By winding up the spring accumulator via a movement of the spring accumulator housing, a considerable simplification and increase in safety can be achieved during the winding operation, possibly also already without use of the above-mentioned braking device. As compared to the spring accumulator shaft, the spring accumulator housing has a larger lever when winding up the spring means, whereby the winding operation can be accomplished with smaller forces. On the other hand, the spring accumulator housing generally has a more favorable surface of engagement for applying a suitable winding device.

When the spring accumulator housing is rotatable with respect to the drive train support as mentioned above, the braking device advantageously is provided between the spring accumulator housing and the drive train support in accordance with a development of the invention. The braking device holds the spring accumulator housing at the drive train support or retards the spring accumulator housing with respect to the same, when the arrestment of the spring accumulator housing has been released for winding purposes.

In particular, the braking device is formed such that during winding it safely maintains the resulting tensioning force of the spring means, but on the other hand the braking or inhibiting force of the brake can be overcome by the positioning forces produced during winding. The braking device provides a braking force which is greater than a biasing force of the spring means and smaller than a predeterminable actuating force for biasing the spring accumulator. The braking device basically can have different designs; for instance, a magnetic, preferably permanent magnetic brake could be provided. However, a preferred embodiment of the invention consists in that the braking device constitutes a frictional brake, in particular a spring-biased frictional brake.

In accordance with a development of the invention, the spring accumulator housing preferably can be seated at the end face on a pivot bearing ring connected with the drive train support, in order to achieve a protected and at the same time small-size arrangement, the braking device advantageously being arranged radially inside said pivot bearing ring. Advantageously, the braking device engages the pivot bearing ring on the one hand and the spring accumulator housing on the other hand. For this purpose, the braking device can include corresponding brake members, one of which is attached to said pivot bearing ring and one to the spring accumulator housing.

In accordance with a development of the invention, the braking device can provide a substantially constant braking force. Alternatively, the braking device can also include an adjusting device for adjusting the braking force, in order to on the one hand hold the spring accumulator housing as desired against the bias produced when winding up the spring accumulator, but on the other hand allow winding up as such. When the braking device constitutes a spring-biased frictional brake as mentioned above, the spring tension can be adjustable for instance by means of an adjusting screw. In principle, however, it is true that a braking device with a constant, preset braking force is sufficient.

To facilitate the winding operation, a drive means for rotatorily driving the spring accumulator housing with respect to the drive train is provided in accordance with a development of the invention. For winding up the spring accumulator, it is, however, merely necessary to rotatorily release the spring accumulator, so that it can be rotated. The rotary movement itself then is accomplished by the drive means.

For this purpose, the drive means in particular constitutes a rotary actuator. This rotary actuator can be mounted on the drive train support with respect to which the spring accumulator housing is rotatable. The rotary actuator can include a drive wheel which can be brought in engagement with the spring accumulator housing.

To maintain the winding operation in the admissible range, a rotational angle and/or speed detecting means for detecting the rotation of the spring accumulator housing in the uncoupled condition is provided for control purposes in accordance with a development of the invention. The rotational angle and/or speed detecting means can form a counter, which advantageously is non-resettable, so that it always indicates the winding condition of the spring accumulator. This is also important for the reverse case of relaxing the spring accumulator for instance in the case of repair. In accordance with a development of the invention, the rotational angle and/or speed detecting means can also be utilized to control the aforementioned winding drive, for instance to the effect that the same is blocked or shut off when the maximum admissible winding condition is reached.

In principle, the spring accumulator can be arranged at various points of the drive train or be coupled with the same. The drive train itself basically can include a preferably electric drive motor and a transmission connected with the drive motor, wherein advantageously the spring accumulator can be coupled with a transmission element, in particular a transmission shaft of said transmission. The arrangement of the drive train components can be chosen completely different therefrom. An advantageous configuration can consist in that the drive motor is arranged transverse to said transmission shaft of the transmission and is in engagement with the same for instance via bevel gear teeth. In this transversely oriented arrangement of the drive motor, the spring accumulator advantageously can be arranged with its spring accumulator shaft parallel, preferably coaxial to the transmission shaft. Said transmission shaft can drive a drive element engageable with the associated rotor blade or with a bearing member carrying the rotor blade.

In accordance with a development of the invention, a disengageable clutch can be provided between the spring accumulator shaft and the aforementioned transmission, in particular the transmission shaft thereof, by means of which the spring accumulator shaft can be uncoupled, so as to be able, for instance, to completely uncouple the spring accumulator from the rotor blade adjusting drive in the case of repair.

BRIEF DESCRIPTION OF THE DRAWINGS

The present invention will be explained in detail below with reference to a preferred embodiment and the associated drawings, in which.

DESCRIPTION OF THE PREFERRED EMBODIMENTS

Figure 1:
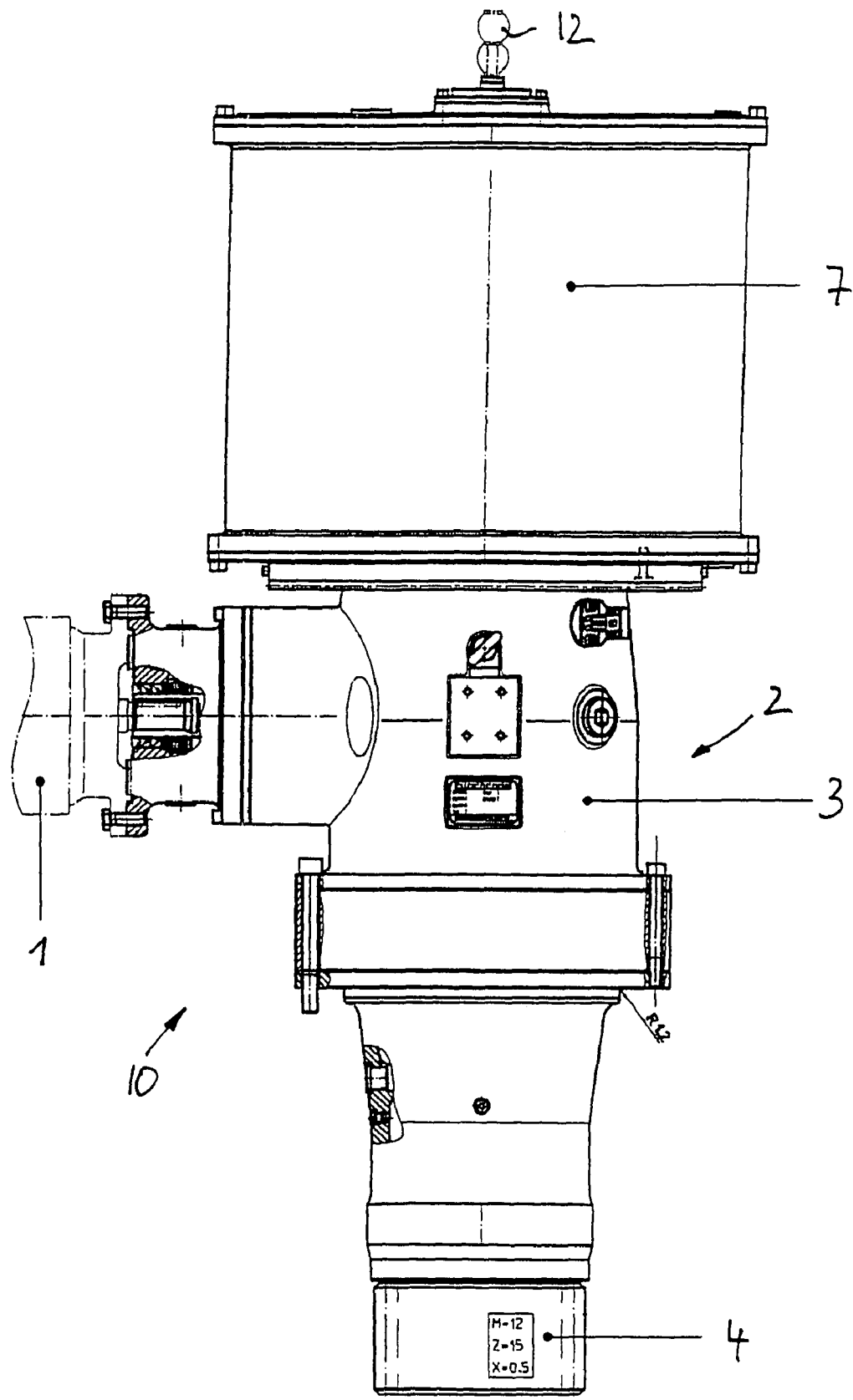
FIG. 1: shows a schematic general view of the rotor blade adjusting drive of a wind power plant in accordance with a preferred embodiment of the invention.

The rotor blade adjusting drive 1 as shown in the Figures comprises an only schematically illustrated drive motor 1, which can be an electric motor and is part of a drive train 2 which includes a transmission 3 downstream of the drive motor 1. With its drive shaft, the drive motor 1 drives an input element of the transmission 3, which at the output end drives an output pinion 4 which rotates the rotor blade of a wind power plant not illustrated in greater detail. For this purpose, said output pinion 4 can be in engagement in particular with the rotatable ring of a large bearing, to which the rotor blade is attached.

Figure 2:
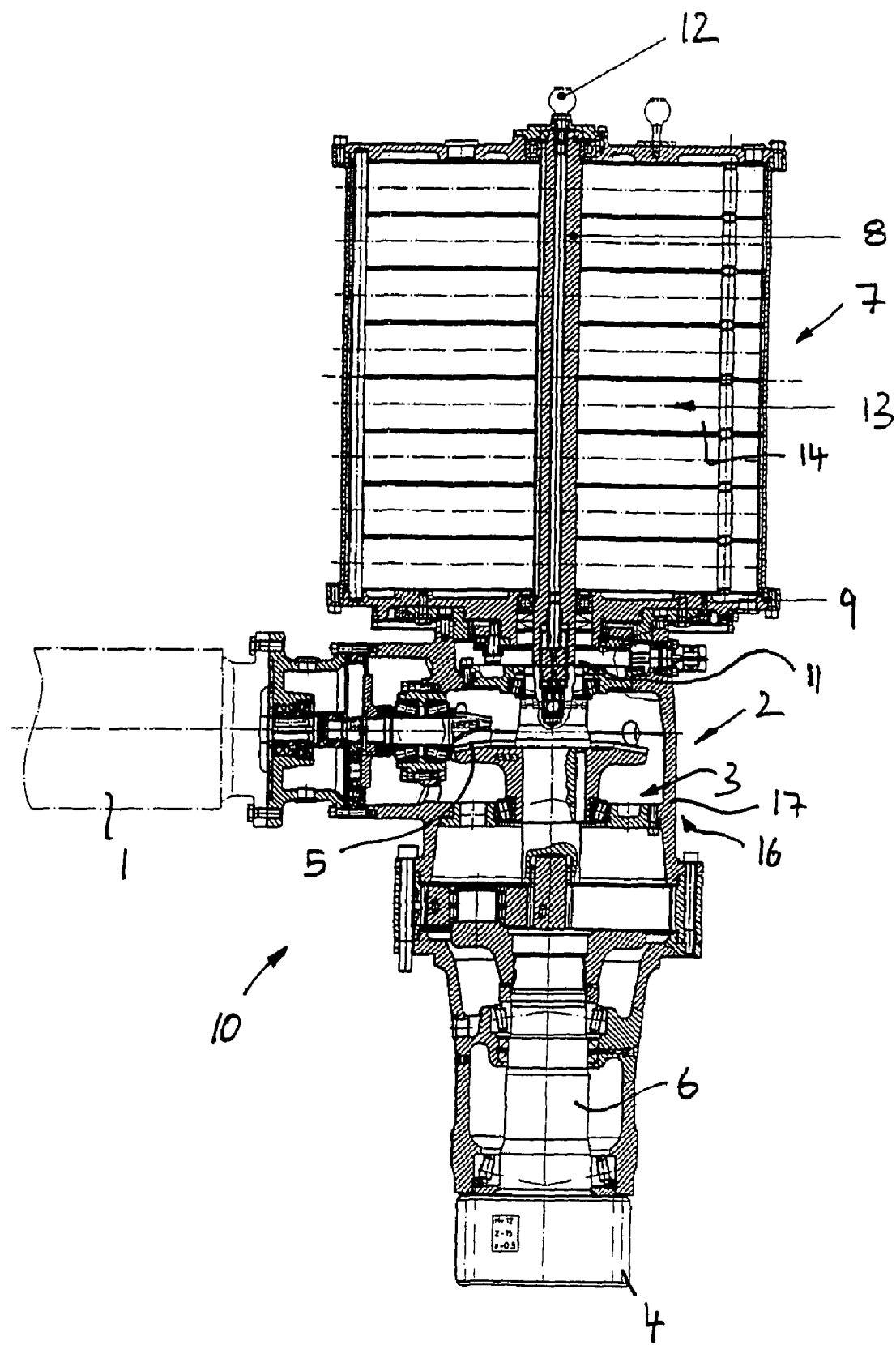
FIG. 2: shows a sectional view of the rotor blade adjusting drive of FIG. 1, and FIG. 3: shows an enlarged sectional view of the interface between the spring accumulator and the transmission of the rotor blade adjusting drive from the preceding Figures.

According to FIG. 2, the transmission 3 as shown here constitutes a bevel gear transmission in which the input axis extends transverse to the output axis. Via a bevel gear stage 5, the drive motor 1 drives a transmission shaft 6 extending transverse to the axis of rotation of the drive motor 1, on which the aforementioned output pinion 4 is seated.

Furthermore, a spring accumulator 7 is connected with the drive train 2, which in the illustrated embodiment is seated on an end face of the transmission 3 opposite the output pinion 4. As shown in FIG. 2, the spring accumulator comprises a central spring accumulator shaft 8, which is rotatably mounted in a spring accumulator housing 9 or a spring accumulator support and in the illustrated embodiment extends coaxial to the aforementioned transmission shaft 6 and can non-rotatably be coupled with the same. For this purpose, a disengageable clutch 11 is provided between the spring accumulator shaft 8 and the transmission shaft 6, which in the illustrated embodiment can be actuated by an actuator 12 at the opposite end of the spring accumulator shaft 8 through an axial recess in the spring accumulator shaft 8. In the illustrated embodiment, the spring accumulator housing 9 to be coupled with a transmission housing 17 is of the closed type and has a substantially cylindrical shape. It is to be understood, however, that the spring accumulator housing 10 need not necessarily form a closed housing, but possibly can also be of the open type or can merely form a spring accumulator support. However, the illustrated closed form is preferred.

Between the spring accumulator shaft 8 and the spring accumulator housing 9, a spring means 13 is provided in the form of a plurality of spiral springs 14. By rotating spring accumulator shaft 8 and spring accumulator housing 9 relative to each other, said spring means 13 can be wound up, so that supported by the spring accumulator housing 9 a torque is produced thereby on the spring accumulator shaft 8 or vice versa.

As shown in FIG. 3, an end-face connecting portion 15 of the spring accumulator housing 9 is seated on a drive train support 16, which in the illustrated embodiment is formed by an end-face connecting portion of the transmission housing 17. The spring accumulator housing 9 is rotatably mounted on the transmission housing 17, namely rotatable about an axis coaxial to the spring accumulator shaft 8. In the illustrated embodiment, the pivot bearing provided for this purpose comprises a pivot bearing ring 19, which by means of screws 20 is firmly attached to the end-face connecting portion of the transmission housing 17. A pivot bearing ring 21 attached to the spring accumulator housing 9 cooperates with said pivot bearing ring 19. In addition, the pivot bearing ring 19 is arranged and supported in a corresponding recess 22 in the end-face connecting portion 15 of the spring accumulator housing 9, where it is retained by the pivot bearing ring 21 overlapping the same.

Said pivot bearing ring 19 attached to the transmission can rotatorily be arrested at the spring accumulator housing 9 by releasable arresting means 23 in the form of threaded bolts 24. To be able to rotate the spring accumulator housing 9 with respect to the transmission housing 17, said threaded bolts 24 are removed; in addition, it possibly can become necessary to loosen the pivot bearing ring 21 by loosening the screws 25 retaining the same.

To prevent the spring accumulator housing 9 from striking back uncontrolled when the pivot bearing is released, a braking device 26 is provided between the spring accumulator housing 9 and the transmission housing 17, which in the illustrated embodiment is disposed radially inside the pivot bearing ring 19 attached to the transmission and includes a braking member attached to the spring accumulator housing and a braking member attached to the transmission housing or to the pivot bearing ring. In the illustrated embodiment, the braking device 26 constitutes a frictional brake. A brake disk 27 or brake plates extend between two brake jaws, which are biased by a brake spring means 28. The braking device 26 is dimensioned such that on the one hand it can hold the biasing forces applied by the spiral springs 14, but on the other hand permits winding up the spring accumulator 7 with a predetermined winding force by rotating the spring accumulator housing 9.

For winding up the spring accumulator 7, a winding drive 29 is provided, which is supported by the transmission housing 17 and includes a drive wheel 30 meshing with a gear rim 31 on the spring accumulator housing 9, in order to correspondingly rotate the spring accumulator housing 9. The winding drive 29 can be actuated for instance by means of a detachable crank handle. Possibly, however, there can also be provided a drive unit actuatable by external energy, for instance in the form of an electric motor.

For detecting the respectively adjusted winding position of the spring accumulator 7, a rotary position detecting means 32 is provided, which can be associated to the winding drive 29, but according to an alternative embodiment of the invention also can directly detect the rotary position of the spring accumulator housing 9. The rotary position detecting means 32 advantageously constitutes a counter 33, which indicates the respective rotary position and counts the revolutions. Advantageously, said counter 33 is not resettable, so that it always indicates the current winding condition of the spring accumulator 7, which on the one hand prevents the spring accumulator 7 from being overtensioned and on the other hand also is important for resetting the spring accumulator 7.

The invention claimed is:

1. A rotor blade adjusting drive for adjusting the pitch angle of a rotor blade of a wind power plant, comprising
    a drive train (2) which at the output end is connectable with the rotor blade and/or a bearing member supporting the rotor blade, and
    a spring accumulator (7) connectable with the drive train (2), which includes
    a spring accumulator shaft (8),
    a spring accumulator housing (9), and
    a spring means (13) which can be tensioned by the rotating spring accumulator shaft (8) and spring accumulator housing (9) relative to each other, wherein
    the spring accumulator shaft (8) and/or the spring accumulator housing (9) can be uncoupled from the drive train (2) and is rotatable with respect to the same for biasing the spring accumulator (7), and
    a braking device (26) is provided for retarding and/or retaining the spring accumulator shaft (8) and/or the spring accumulator housing (9) against the spring bias in the uncoupled condition of the spring accumulator (7).

2. The rotor blade adjusting drive according to claim 1, wherein the spring accumulator (7) is formed to be tensionable when the spring accumulator shaft is engaged, in particular by actuating the spring accumulator housing (9).

3. The rotor blade adjusting drive according to claim 2, wherein the spring accumulator housing (9) is rotatably mounted on a drive train support (16) by a pivot bearing (18).

4. The rotor blade adjusting drive according to claim 1, wherein the spring accumulator housing (9) is rotatably mounted on a drive train support (16) by a pivot bearing (18).

5. The rotor blade adjusting drive according to claim 1, wherein releasable arresting means (23) are provided for arresting the spring accumulator housing (9) in at least one predetermined rotary position with respect to the drive train support (16).

6. The rotor blade adjusting drive according to claim 5, wherein the spring accumulator housing (9) is rotatably mounted on a drive train support (16) by a pivot bearing (18), and braking device (26) is provided between the spring accumulator housing (9) and the drive train support (16).

7. The rotor blade adjusting drive according to claim 6, wherein the spring accumulator housing (9) is seated on a pivot bearing ring (19) on the end face and the braking device (26) is disposed radially inside the pivot bearing ring (19), in particular engages the pivot bearing ring (19) and the spring accumulator housing (9).

8. The rotor blade adjusting drive according to claim 1, wherein the braking device (26) provides a braking force which is greater than a biasing force of the spring means (13) and smaller than a specifiable winding force for winding up the spring accumulator (7).

9. The rotor blade adjusting drive according to claim 1, wherein the braking device (26) constitutes a frictional brake, in particular a spring-biased frictional brake.

10. The rotor blade adjusting drive according to claim 1, wherein a winding drive (21) is provided for winding up the spring accumulator (7).

11. The rotor blade adjusting drive according to claim 10, wherein the winding drive (21) includes a drive means for rotatorily driving the spring accumulator housing (9) with respect to the drive train (2).

12. The rotor blade adjusting drive according to claim 11, wherein the drive means constitutes a rotary drive, which is mounted on the drive train support (2) and includes a drive wheel (30) engageable with the spring accumulator housing (9).

13. The rotor blade adjusting drive according to claim 1, wherein a winding condition monitoring means is provided for monitoring the winding condition of the spring accumulator (7).

14. The rotor blade adjusting drive according to claim 13, wherein the winding condition monitoring means includes a rotational angle and/or speed detecting means (32) for detecting the rotary position of the spring accumulator housing (9).

15. The rotor blade adjusting drive according to claim 14, wherein the winding condition monitoring means is formed to be non-resettable.

16. The rotor blade adjusting drive according to claim 1, wherein the drive train (2) includes a drive motor (1) and a transmission (3) connectable with the drive motor (1), the spring accumulator (7) being connectable with a transmission element, in particular a transmission shaft (6) of the transmission (3).

17. The rotor blade adjusting drive according to claim 16, wherein the drive motor (1) is arranged transverse to a transmission shaft (6) of the transmission (3) and the spring accumulator shaft (8) of the spring accumulator (7) is arranged parallel, preferably coaxial to the transmission shaft (6).

18. The rotor blade adjusting drive according to claim 17, wherein the transmission shaft (6) includes an output element which can be brought in engagement with the rotor blade and/or the bearing member supporting the rotor blade.

19. The rotor blade adjusting drive according to claim 1, wherein a disengageable clutch (11) is provided between the spring accumulator shaft (8) and the drive train (2).

20. A wind power plant with a rotor blade adjusting drive according to claim 1.

* * * * *